United States Patent Office 3,367,021
Patented Feb. 6, 1968

3,367,021
PROCESS FOR WELDING COMPOSITE METAL-OXIDE MATERIALS SUCH AS SINTERED ALUMINUM POWDER (S.A.P.)
Giorgio Beghi, Gavirate, Varese, and Giuseppe Musso, Cadrezzate, Varese, Italy, assignors to European Atomic Energy Community—Euratom, Brussels, Belgium
No Drawing. Filed July 2, 1965, Ser. No. 469,327
Claims priority, application Great Britain, July 31, 1964, 30,352/64
5 Claims. (Cl. 29—472.9)

The invention relates to the welding of composite metal-oxide materials such as sintered aluminium powder (later referred to as S.A.P.) and like cerments.

Sintered aluminum powder (S.A.P.) of the composition $Al-Al_2O_3$ is a material with excellent properties to be used in nuclear fuel element fabrication. However, it has previously been considered impossible to realise connections of S.A.P. members by fusion welding, without destroying the good mechanical properties of the S.A.P. material. Therefore with all welding methods hitherto proposed for or applied to S.A.P. welding, as for instance flash welding, hot pressure welding, electron beam welding with or without aluminium alloy interposing, plastic deformation welding, reaching of the fusion temperature of the S.A.P. material is carefully avoided.

Contrary to this, research work carried out by us has recently shown that fusion of the composition $Al-Al_2O_3$ does not modify its structure, when carefully controlled. Based on this fact, successful attempts have been made to connect S.A.P. members by fusion welding.

As a result of the experiments it has been found, that seamless junctions between metal-oxide members, of the same or different compositions or between metal-oxide members and metal-, or metal alloy-members are obtained without deteriorating the properties of the metal-oxide when, and this constitutes the present invention, the metal-oxide-member is carefully heated in the junction zone up to a fusion or softening temperature which in the case of S.A.P. is not higher than 800° C. and not lower than 670° and is preferably slightly above the melting point of the metal-oxide-matrix, and the member to be connected is then gently immersed into the central area of the fused zone for a time preferably varying between 5 to 6 minutes, the obtained junction being allowed then to cool down. The welding action is favoured when during the immersion one of the members is rotated slowly. Also, the surface of the member to be immersed should be clean and even-shaped to facilitate immersions and welding.

The invention will now be described in more detail. Reference is made to the fabrication step of closing a S.A.P. fuel element can by aid of S.A.P. plugs to be fixed at the open ends of the canning tube. A cylindrical S.A.P.-body of the approximate shape of the final plugs but somewhat greater in diameter and length than the plugs is heated up in a form-closed crucible of graphite or stainless steel which heats the fused body to about 700° C. in a few minutes (e.g. 5). The body's composition is: 96–86% Al, and 4–14% $Al_2O_3$. The S.A.P. canning tube (7% of $Al_2O_3$) has a diameter somewhat smaller than of the S.A.P.-body. The part of the tube to be immersed is clean and presents an external thread to facilitate the introduction of the tube into the S.A.P.-body. When the fusion temperature of the S.A.P.-body is reached, the tube with its threaded part is introduced into the S.A.P.-body, which is pasty at fusion temperature. The tube may be either cold or hot for the purpose of welding. The immersion velocity is about 1 cm./sec.; simultaneously the tube is rotated once. All operations are effected either under ambient atmosphere or under protection gas. The fusion and welding temperature is maintained for 5 minutes. Then the electric heating device of the crucible is turned off and the junction is allowed to cool down.

During the heating treatment, the peripheral zone of the S.A.P.-body undergoes cracking and is wasted for later purposes. This is the reason why the radial dimensions of the S.A.P.-body have to be chosen large enough, in order to preserve an homogeneous material in the middle of the body to constitute the proper plug. The wasted parts are taken off by machining. At the same time, the final dimensions of the plug, which after welding forms an integral part of the canning tube, are obtained. Machining may cover the techniques of extrusion or swaging. By these or other kinds of treatment, the mechanical properties of the welded S.A.P. material can even be improved with respect to the initial ones.

The welding temperature for S.A.P. should not be higher than 800° C. and not lower than 670° C. The time of immersion of the member to be welded on the other before cooling may be between 5 and 6 min. It should be noted that with the new welding method in the case of closing a fuel element tube, S.A.P. plugs which are massive and of any geometric form can be welded. And as the welded zone can be machined easily, hitherto remaining porosity of the plugs is eliminated.

The new welding method is not limited to junctions with both components consisting of S.A.P. nor is it limited to S.A.P. at all. One member may likewise consist of metallic material only like aluminium, magnesium or a metal alloy like zircalloy; and instead of S.A.P., other cermets with a dispersed phase sufficiently stable within the liquid matrix can be welded according to the invention. But in most cases it is the cermet body that must be fused.

Instead of moving the member to be welded on, also the fused body can be moved during immersion action. Further, more than two members can be welded on the same base member, provided that welding is not performed in a zone already heated up once.

We claim:
1. A method of fusing a sintered aluminum powder (S.A.P.) member to a second member selected from the group consisting of a cermet, metal and metal alloy; comprising carefully heating said sintered aluminum powder member to a temperature slightly above its melting point and slowly immersing said second member into said fused sintered aluminum powder member and slowly cooling the resultant junction.

2. The process according to claim 1 in which the sintered aluminum powder member is heated to a temperature not higher than 800° and not lower than 670° C.

3. The process according to claim 2 in which the member is immersed in the fused zone for 5 to 6 minutes before cooling.

4. The process according to claim 1 in which one of the members is rotated during the immersion step.

5. The process according to claim 3 in which one of the members is rotated during the immersion step.

References Cited

UNITED STATES PATENTS 2,946,119   7/1960   Jones et al. _____ 29—470
3,247,591   4/1966   Panseri _____ 29—497.5 X Fuel Element Fabrication, International Atomic Energy Agency, v. 1, pp. 153–154, 1961.

JOHN F. CAMPBELL, *Primary Examiner.*

J. L. CLINE, *Assistant Examiner.*